United States Patent [19]

Derighetti

[11] Patent Number: 5,434,379
[45] Date of Patent: Jul. 18, 1995

[54] APPARATUS FOR AND METHOD OF ELECTRO-DISCHARGE CUTTING

[75] Inventor: Rene Derighetti, Losone, Switzerland

[73] Assignee: A.G. für Industrielle Elektronik AGIE Losone, Losone, Switzerland

[21] Appl. No.: 111,132

[22] Filed: Aug. 24, 1993

[30] Foreign Application Priority Data

Aug. 26, 1992 [DE] Germany .................. 42 28 330.2

[51] Int. Cl.⁶ .................. B23H 7/10; B23H 7/06
[52] U.S. Cl. .................. 219/69.12
[58] Field of Search .................. 219/69.12

[56] References Cited

U.S. PATENT DOCUMENTS

| | | | |
|---|---|---|---|
| 3,830,996 | 8/1974 | Ullmann et al. | 219/69.12 |
| 3,943,322 | 3/1976 | Lehmann et al. | 219/69.12 |
| 4,123,645 | 10/1978 | Shichida et al. | 219/69.12 |
| 4,232,208 | 11/1980 | Bühler | 219/69.12 |
| 4,314,133 | 2/1982 | Pfau et al. | 219/69.12 |
| 4,506,129 | 3/1985 | Katsube et al. | 219/69.12 |
| 4,736,086 | 4/1988 | Obara | 219/69.12 |
| 4,883,933 | 11/1989 | Yatomi et al. | 219/69.12 |
| 4,883,934 | 11/1989 | Mamin et al. | 219/69.12 |
| 5,057,663 | 10/1991 | Kinoshita | 219/69.12 |
| 5,162,630 | 11/1992 | Iwasaki | 219/69.12 |

FOREIGN PATENT DOCUMENTS

| | | |
|---|---|---|
| 043673 | 1/1982 | European Pat. Off. . |
| 348534 | 1/1990 | European Pat. Off. . |
| 2342121 | 9/1977 | France . |
| 2856231 | 2/1987 | Germany . |
| 58-028424 | 2/1983 | Japan . |
| 60-62420 | 4/1985 | Japan ............. 219/69.12 |
| 655884 | 5/1986 | Switzerland . |

*Primary Examiner*—Geoffrey S. Evans
*Attorney, Agent, or Firm*—Egli International; Christa Hildebrand

[57] ABSTRACT

Apparatus for and method of electro-erosive cutting with a cathode in the form of a wire. The wire advances through at least one or two guides, especially open V-grooved guides that do not surround the wire. One wire guide is upstream and the other downstream, in the direction the wire advances along, of the workpiece being processed. The wire guide or guides can rotate around the wire.

15 Claims, 6 Drawing Sheets

APPARATUS FOR AND METHOD OF ELECTRO-DISCHARGE CUTTING

BACKGROUND OF THE INVENTION

The present invention concerns apparatus for and a method of electro-erosive cutting with a cathode in the form of a wire that advances through at least one or two guides, especially open guides, open V-grooved guides that do not surround the wire, that is.

Many types of apparatus for and of methods of electro-erosive cutting are known. The basic apparatus usually comprises a stand with transmissions and wiring, a rinsing system, a generator, and numerical or computerized numerical controls. A cathode in the form of a wire cuts a blank out of the workpiece, which constitutes the anode, starting with an already drilled hole or reference point.

A particular problem encountered in electro-erosive cutting is to obtain wire guides that are appropriate for cutting at conical angles. This is particularly true of guides accommodated in stationary processing heads or wire-guide heads. There are definite limitations to cutting at angles of 0° to 45°. The problem is less prevalent with guides accommodated in rotating heads.

SUMMARY OF THE INVENTION

The object of the present invention is to improve electro-erosive cutting, especially at conical angles.

The basic concept of the invention is accordingly that at least one and preferably both wire guides (one upstream and one downstream of the workpiece being processed) are rotating wire guides and rotate around the wire (or around its axis) while it is cutting in accordance with the geometry of the cut, especially while it is cutting at a conical angle. The advantage is that the guide or guides can constantly be rotated along the cut such that the wire always maintains a definite position in the guide and cannot slip skid and in particular will not slip out of the guide unintendedly, meaning, in the event that the guides are open guides, guides with open V-grooves, that is, that it will always remain at the base of the open V-groove. Rotating wire guides are not complicated and represent an economically desirable alternative to rotating processing heads. To cut at a conical angle for example it is necessary only to displace the wire guides (in the X-Y plane) and the workpiece (in the U-V plane) relative to each other and rotate them such that the wire always rests against the desired point in the guide.

There exist of course at the state of the art wire guides in the form of toruses that the wire cannot slip out of. At acute conical angles, however, more specifically at angles more acute than the angle between a straight line through the farthest downstream wirecontact point upstream of the torus and a point on the inner circumference of the torus and a perpendicular through the center of the torus, it cannot be ensured that the wire will rest tight against the circumference.

Again, since toruses are also less precise than open V-grooved guides, the apparatus itself will not operate with sufficient precision in certain circumstances.

It has accordingly always been necessary for the opening through the center of the toroidal guide to be just slightly wider than the wire is thick to the greatest extent possible. When the wire is thin, however, this ratio no longer makes sense, quite aside from the difficulties encountered in threading such a wire automatically.

It is here that the present invention comes into force. Surprisingly, the directly or indirectly rotating wire guide even makes it possible to do without closed wire guides, toruses that is. The rotating guide assumes so to speak all the functions of the torus but without the latter's drawbacks. The open V-groove readily accepts a threaded wire of almost any thickness.

In performing a conical cut the open wire guide is rotated as constantly as possible for example until its opening faces the axis of rotation, at which time the wire will be forced tight into the open V-groove.

An auxiliary wire guide is associated with at least one wire guide in an especially preferred embodiment of the invention and both are mutually displaced vertically or horizontally. This version embodies a particularly interesting aspect of the invention, specifically a combination of two guides (a regular guide and an auxiliary guide) on each side of the workpiece being processed (for a total of four guides). The wire for example advances first through the auxiliary wire guide (the upper guide e.g.,which can be a open V-grooved guide) farther away from the cylinder's axis of rotation (also called the central axis or center) and then through the guide nearer the center of the cylinder. The resulting tension on the wire ensures high precision even at very acute conical angles. The displacement between the auxiliary wire guide and the regular wire guide dictates how forcefully the wire is forced into the open V-groove at acute conical angles alone. When there is no force on the wire there is no critical angle.

The ability of at least one of the wire guides to rotate in another preferred embodiment of the invention is due to its being accommodated in a rotating and especially cylindrical processing head. The processing head, as it rotates, rotates the wire guide accommodated inside it. This is a very simple means of providing the wire guides (including the auxiliary wire guides e.g.)with the ability to rotate.

The auxiliary wire guide farther away from the workpiece in another preferred embodiment of the invention constitutes a source of electric current in the form of a ring with sliding contacts. The ring actually functions as a wire guide. This embodiment is cost-effective in that it combines two functions. Similar embodiments are conceivable that feature a conventional toroidal guide on one side of the workpiece and a rotating wire guide on the other side.

One particularly preferred version of the invention features at least one motor that is electrically connected to computerized numerical controls and rotates the wire guide or guides automatically. The motor can if necessary be provided with a transmission and is controlled by the computerized controls by way of a decoder. The motor and computerized controls make it possible to rotate the wire guides completely automatically and allow the wire to cut in whatever direction is necessary. Two motors are even more convenient, one in the apparatus' upper arm and one in its lower arm. The instant position can be monitored for example with a low-resolution rotation sensor and a zero signal. The zero point can be searched for like the zero point in the U-V plane.

A wire-position sensor communicates with the computerized controls in another preferred embodiment of the invention. Wire-position sensors are manufactured by AGIE (Aktiengesellschaft für Industrielle Elektronik) for example and are accordingly known. They make it possible to accelerate cutting without loss of precision. Wire-position sensors are accordingly of tremendous advantage in rotating wire guides as well.

At least one wire threader with a opening and plug is coupled to the rotating wire guide in another version of the invention. Coupling a wire threader to the rotating wire guide makes it possible to automatically thread a wire through the workpiece even when the wire guides are rotating guides. If the wire threader were not rotating, it would hardly be possible to cut at a sufficiently obtuse conical angle because the exit from the threading tube would have to be too wide. A combination of rotation and plug is a satisfactory solution. The slot in the tube can alternatively be closed by means other than a plug, by elastic deformation for example. The elasticity in this event will function like a plug.

The curvature of the cross-sectional contour of the wire guide in another especially preferred advanced version of the invention gradually increases as it approaches the workpiece. This gradual increase, surprisingly, compensates for the variation in tension on the wire that occurs with different obtuse conical angles. Too little curvature would plasmically deform the wire and is to be avoided.

With the concept of rotating one or more wire guides, by in the present case rotating processing heads fastened to the wire guides, in order to improve the wire's cut at conical angles as the point of departure, the advantages of certain further teaching in accordance with the invention will also become apparent. In accordance with this teaching a wire threader for electro-erosive apparatus is rigidly fastened to a processing head that accommodates the wire guide. This approach ensures that a spatial relationship once established as ideal between the wire guide and the wire threader will be maintained even if the wire guide rotates later. It is particularly preferred in this event for the wire threader to have a pressurized chamber that can be sealed off.

Further teaching that the rotating wire guides render particularly sensible relates to a wire guide, especially an open, or open V-grooved, wire guide, for electro-erosive apparatus, whereby the curvature of its cross-sectional contour varies and in particular increases continuously. Particularly advantageous embodiments of this concept result from curvature in the form of a parabola or of two superposed arcs of circles.

The open V-grooved wire guide or guides in one especially preferred version of the method in accordance with the invention is or are essentially rotated while the wire is cutting at a conical angle to ensure that the force securing the wire in the guide is maximal. It accordingly becomes possible to easily cut at even obtuse conical angles without a toroidal guide. The computerized numerical controls define the ideal rotation (especially the extent and speed of the rotation) in accordance with an appropriate algorithm for the particular cutting parameter (e.g. the rate and direction of advance, etc.).

It is of particular advantage to determine the rotation and position of the wire guide or guides in relation to the point of origin of the coordinate planes by way of an ideal point in the U–V plane from a programmed conical angle. It will accordingly be easy to determine a rotation from the ideal point that is to included.

The rotation and position of the wire guide can alternatively be determined relative to the point of origin of the coordinate planes in analogy to the ideal points in the U–V plane from the prescribe conical angle.

It is especially advantageous finally to determine the rotation of the wire guide around the wire with an incrementally restricted directional correction in order to avoid unnecessarily rapid rotations. Unnecessarily rapid rotations are undesired for high-precision cutting. They can easily be handled in accordance with the invention by executing the rotation in increments or short steps. When for example the cut changes direction (as when cutting a 90° corner at a conical angle of 30°), the wire guides need not be rotated 90° all at once. The rotation can be initiated just before the wire arrives at the corner, which can be cut in small steps. Small deviations in the orientation of the open V-groove in relation to the ideal angle have a substantial effect on precision.

Individual manufacturing and/or assembly parameters are in one preferred advanced version of the method in accordance with the invention retrieved from a memory and exploited to rotate and position the wire guide in relation to the point of origin of the coordinate planes. The result is high-precision adaptation of the invention to specific apparatus. Imprecision in carrying out the additional motion is easily compensated for. It is of particular advantage in high-precision systems when such a (mechanical) correction in the position of the wire can be calculated as a function of angle.

In another preferred version of the invention finally the actual position of the wire guide or guides is measured absolutely. Absolute measurements in relation to one point on the machinery for example can be exploited to attain a limited level of precision at a definite savings. This feature is of particular advantage in cost-effective apparatus that are not expected to satisfy rigid demands.

In another version of the invention positional errors are nicely corrected in accordance with the angle and shape of the guide. This surprising approach is particularly reasonable when a guide with a varying curvature is employed.

The open V-grooved wire guide is rotated in one especially preferred embodiment of the invention in at least three different zones while the wire is cutting at a conical angle, specifically only in increments for purposes of correction in zone Z1, at an angle of 90° in zone Z2, and essentially toward the axis of rotation in zone Z3. This combination of various rotation tactics is particularly appropriate for the various conditions in the individual zones. Rapid and unnecessary rotations in response to small deviations from the center (at acute conical angles, that is) can in particular be avoided.

BRIEF DESCRIPTION OF THE DRAWINGS

Embodiments of the present invention will now be specified by way of example and its differences from the state of the art described with reference to the drawing, wherein.

DESCRIPTION OF THE PREFERRED EMBODIMENTS

The terminology employed hereinafter is intended to facilitate comprehension of the present invention without limiting it in any way. The terms "top," "bottom," "narrower," and "wider" in particular are to be understood as referring to apparatus of conventional orientation and size and to conventionally mounted workpiece.

Figure 1:
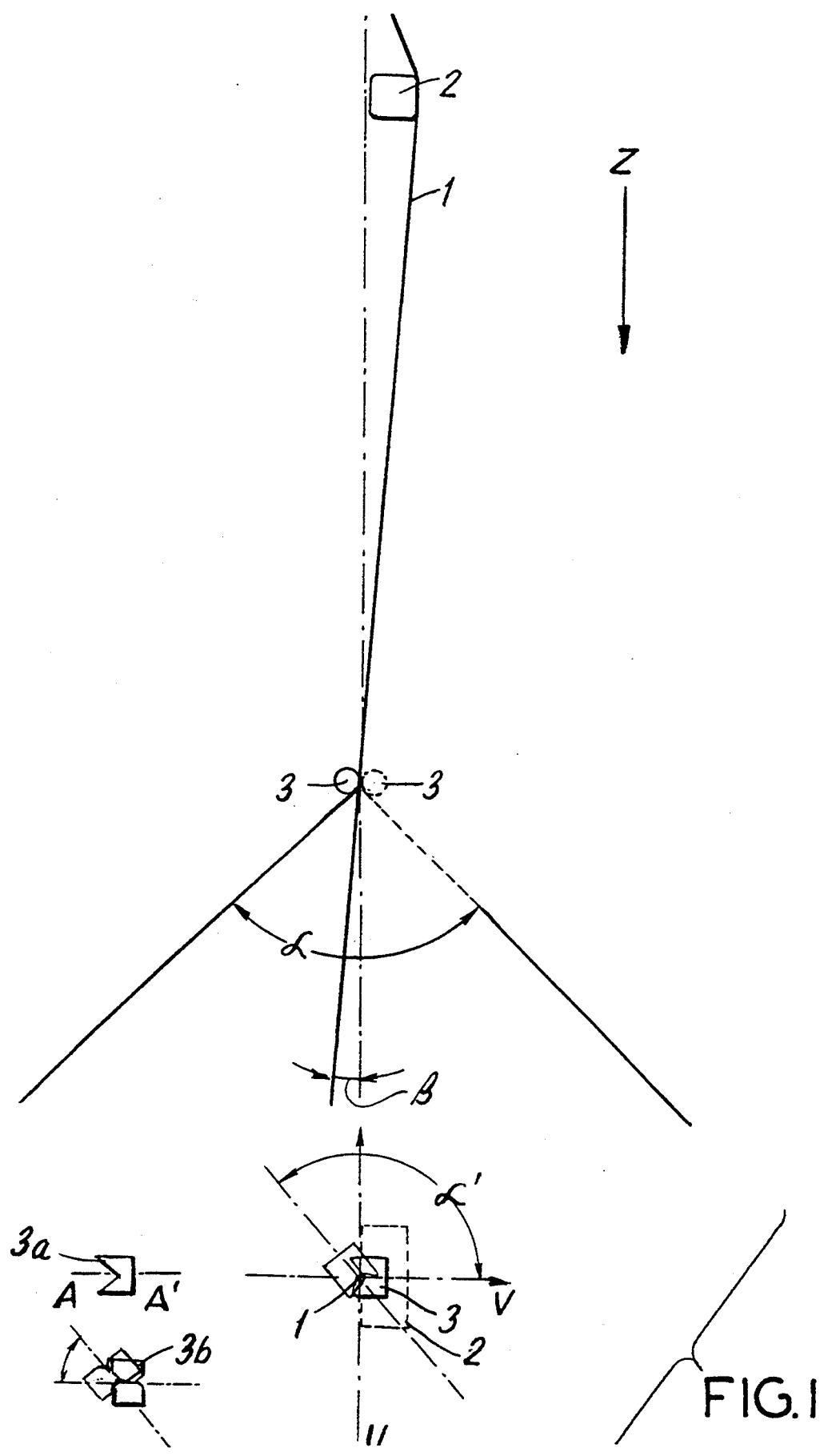
FIG. 1 is a schematic view of various components of electro-erosive apparatus in accordance with the invention.

FIG. 1 illustrates components in accordance with the invention of apparatus for electro-erosive in accordance with the invention. Basic elements like the stand with its transmissions and wiring, rinsing system, generator, and computerized numerical controls are considered to be in-themselves known and are accordingly not specified.

A cathode in the form of a wire 1 is unrolled and conveyed down into the apparatus in the direction indicated by arrow Z by an unillustrated wire advance. A source 2 of electric current conventionally supplies pulses from an unillustrated generator. Rotating downstream of source 2 of electric current is a wire guide in the form of a open V-grooved wire guide 3, its rotation indicated by double representation, with the broken line representing a 180° rotation from the position represented by the continuous line. Open V-grooved wire guide 3 is represented as a circle in the upper portion of FIG. 1.

At the bottom left of FIG. 1 are illustrated two different versions of an open, or open V-grooved, wire guide, one guide 3a machined out of a single blank and with a open V-groove relatively extensive in relation to the wire and another guide 3b composed of halves machined out of two different blanks and with shallower open V-grooves.

Open wire guide 3 is rotated to an angle at which the untensioned wire will rest as far as possible inside the open V-groove. The vertical that the untensioned wire descends along coincides with the longitudinal axis of the wire, extends in the apparatus' Z direction, and constitutes the axis of rotation, the central axis, or the center of the wire guides.

If a cut should be performed in the workpiece at an angle $\alpha$ to the axis of rotation, at a conical angle in other words, all that is necessary, in addition to the displacement of wire guide or guides 3 in the U-V (and/or X-Y) plane to slope wire 1, is to rotate wire guide 3 around the axis of rotation in order to force the wire against the base of the open V-groove (or until wire 1 wraps around the guide along the conical cut). Although this rotation is in principle independent of the width of the conical angle, it is surprisingly of advantage as will be specified hereinafter to include the width of the conical angle in the width of the angle of rotation (in the U-V or X-Y plane or both).

The rotation will be particularly evident from the top view in the middle at the bottom of FIG. 1. Wire guide 3 rests as illustrated at the top of the figure downstream of source 2 of electric current (represented by the broken line). The position of wire 1 represented by the thick line constitutes by definition a rotation of 0° on the part of wire guide 3 in the U-V plane. The thin line represents a rotation $\alpha'$. In relation to the 0° position, rotation $\alpha'$ approximately represents a cut in the $-135$ direction (with a conical angle of 0° to 90° perpendicular thereto).

There is, however, a peculiarity to this situation. Since the wire 1 illustrated in FIG. 1 wraps around source 2 of electric current, it will not be tensioned into the downstream wire guide 3 when the conical angle that the cut will be cut at is precisely a certain critical angle $\beta$. This angle occurs in direction u between the axis of rotation and the direction followed by the wire from its midpoint in wire guide 3 to its midpoint at the level of source 2 of electric current. There will be nothing to force wire 1 into wire guide 3 at critical angle $\beta$ no matter how far the guide is rotated.

Figure 2:
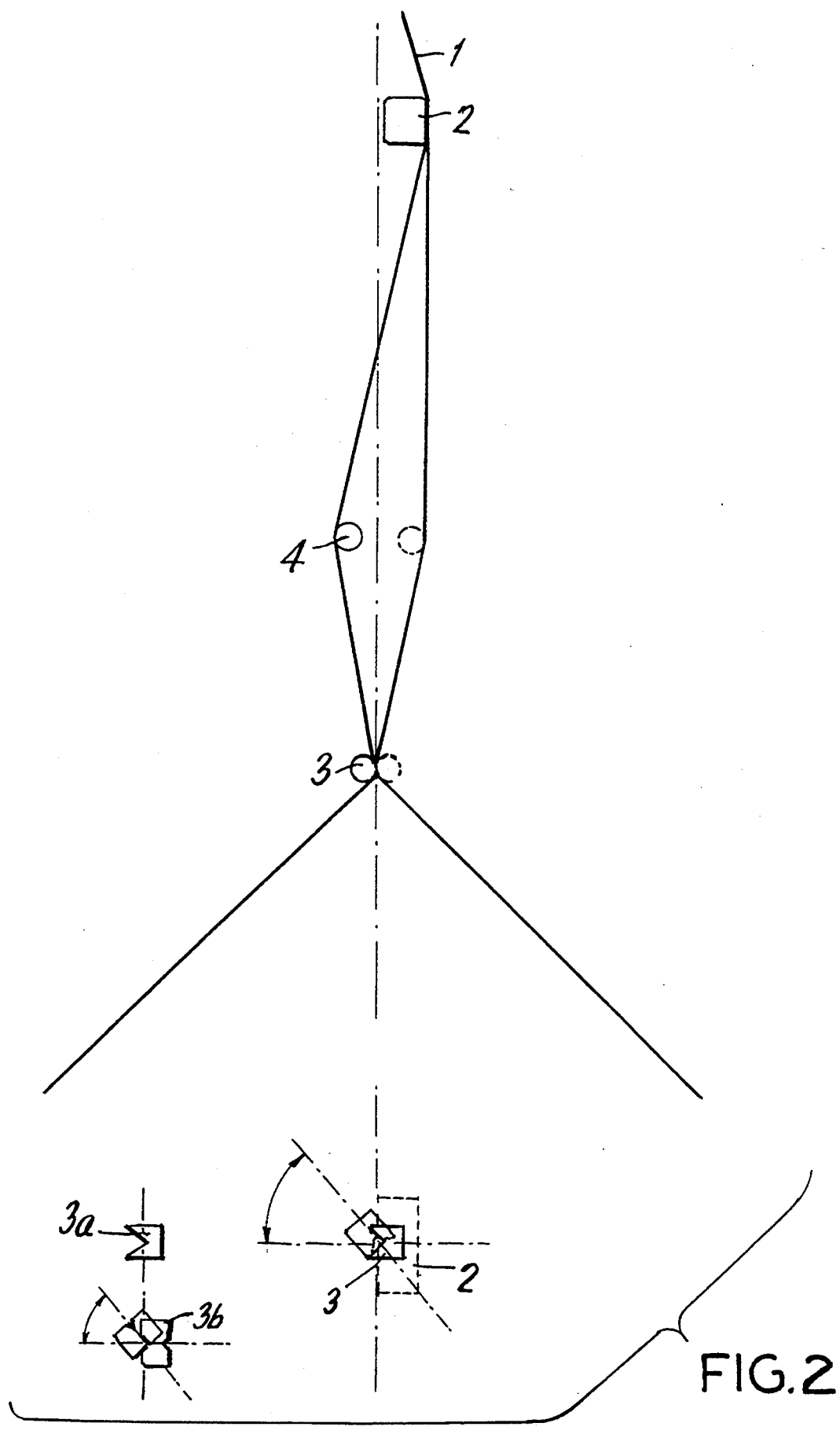
FIG. 2 is a schematic view of various components of another embodiment of electro-erosive apparatus in accordance with the invention.

This result can be eliminated, however, in accordance with the surprising advanced version of the invention illustrated in FIG. 2. Associated with the wire guide 3 in this version is another wire guide, a rotating auxiliary wire guide 4. Auxiliary wire guide 4 is farther from the workpiece than wire guide 3 and ensures that the wire will be tensioned into wire guide 3 no matter how far the guide is rotated because it will always be wrapped around it. A cut can accordingly be precisely cut at any ordinary conical angle, even a very acute angle, and in any direction. At very acute conical angles, surprisingly, it will in some cases not even be necessary to rotate wire guide 3 or wire guides 3 and 4. Furthermore, since auxiliary wire guide 4 is between source 2 of electric current and the wire guide 3 in the vicinity of the workpiece and is remote from the auxiliary wire guide and from the axis of rotation, wire 1 will be tensioned into wire guide 3 no matter how far it is rotated. FIG. 2 of course is not drawn to scale.

The displacement between auxiliary wire guide 4, which is remote from the workpiece, and wire guide 3, which is near the workpiece, dictates the force that forces wire 1 against the guide. There is no critical angle when there is no force against the wire.

Wire guide 3, which is the lower guide, is oriented such that the midpoint of the wire 1 resting in it precisely coincides with its axis of rotation. This relationship exists, however, only when the wire is of a certain thickness. The midpoint of other wires will not coincide with the axis of rotation. Although the wire will still move in a circle when the guide rotates, it will in itself neither rotate nor twist. It is possible in principle to shift wire guide 3 in accordance with how thick the wire is until the midpoint of the wire coincides with the guide's axis of rotation. It is on the other hand possible in accordance with an especially practical version of the invention to calculate positional corrections automatically or by way of a wire-position sensor.

Figure 3:
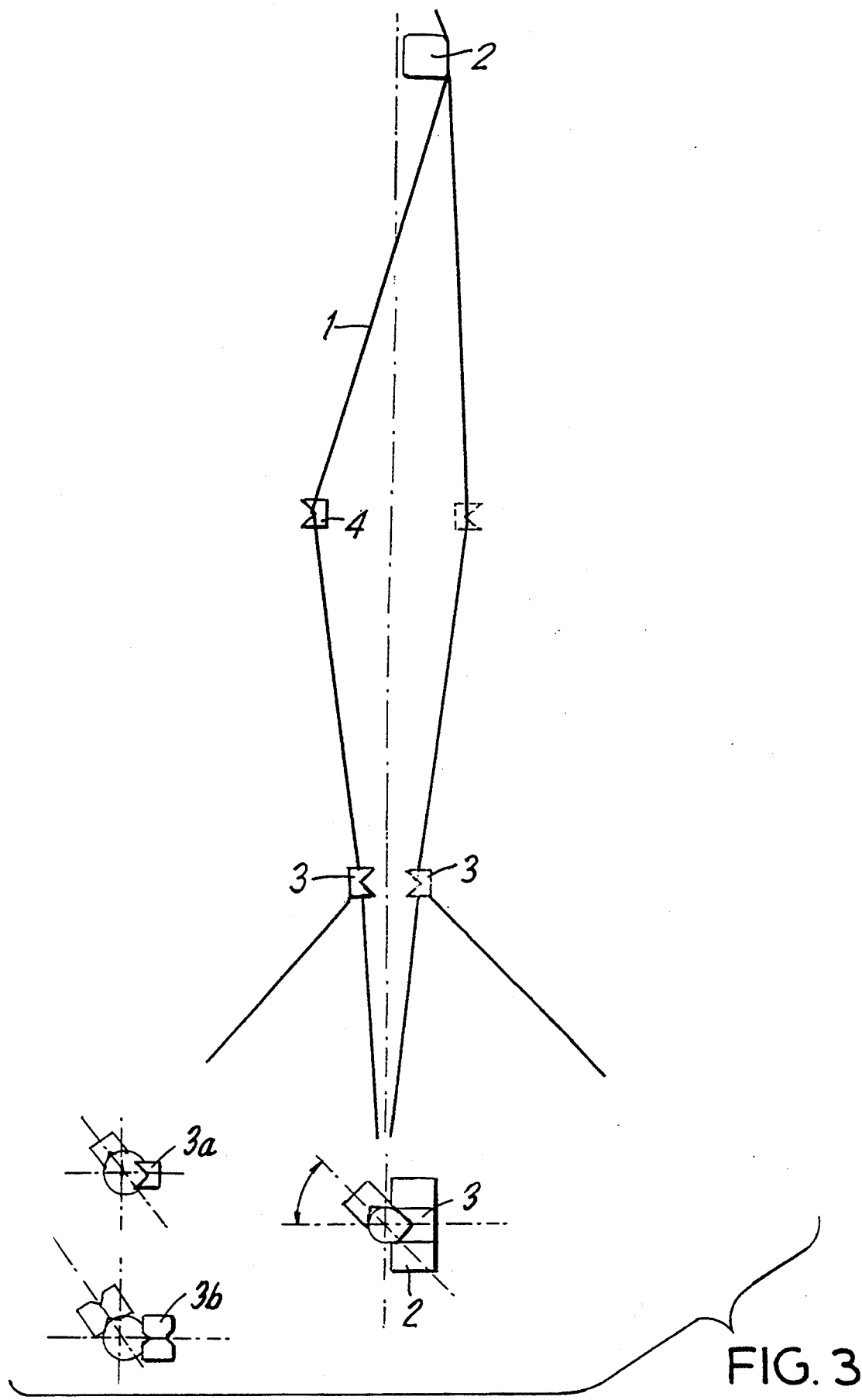
FIG. 3 is a schematic view of various components of a third embodiment of electro-erosive apparatus in accordance with the invention.

The determination of such corrections in accordance with the thickness of the wire makes still another attractive version of the invention, illustrated in FIG. 3, possible. Wire guide 3, which is again the lower guide, is no longer oriented such that the midpoint of wire 1 coincides with the guide's axis of rotation. The midpoint of the wire now describes a small circle during one full rotation (360°) of the guide. This version of the invention creates space that can for example be exploited to accommodate a wire threader.

Figure 4:
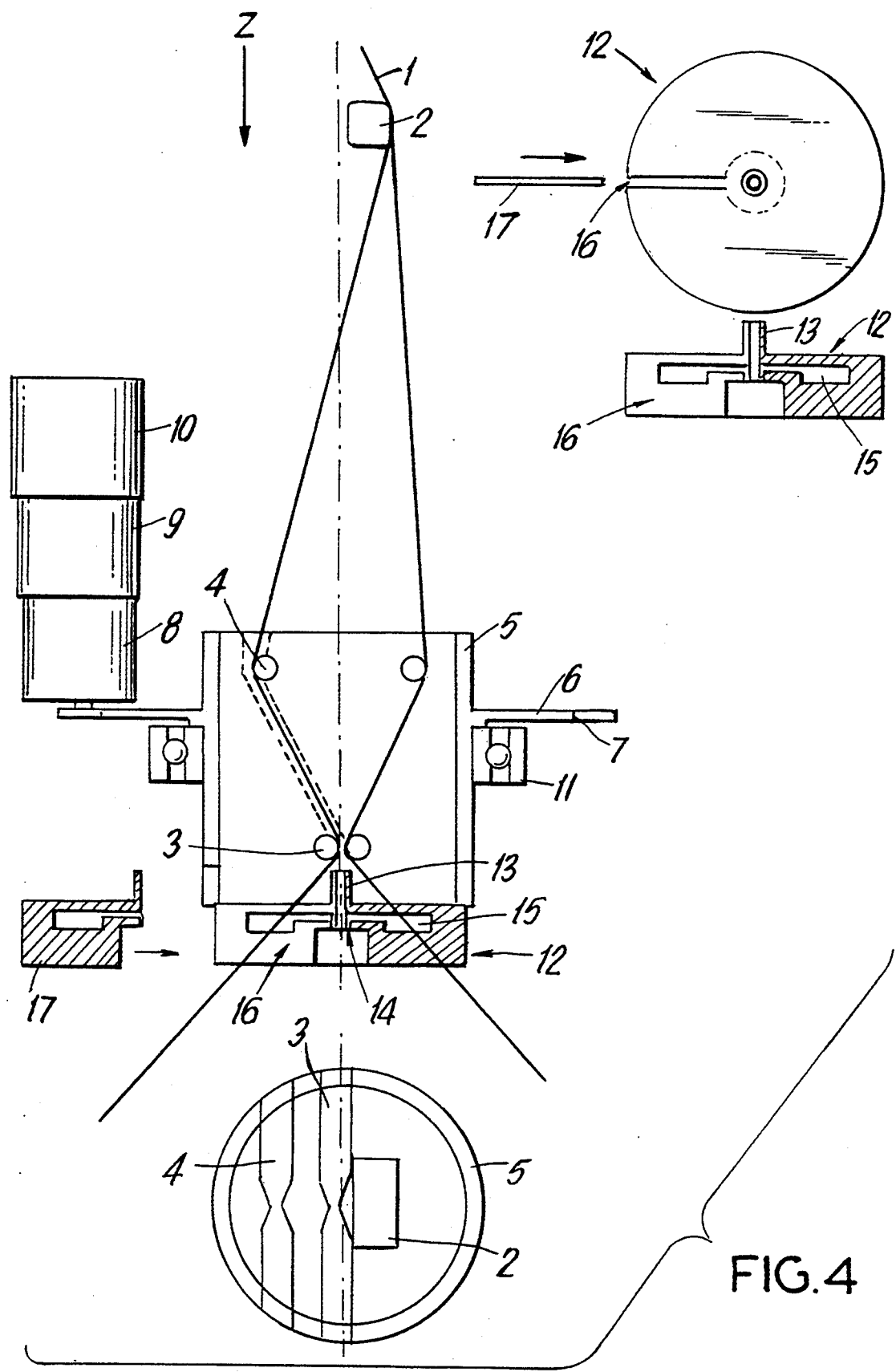
FIG. 4 is a schematic view of various components of a fourth embodiment of electro-erosive apparatus in accordance with the invention.

FIG. 4 illustrates another embodiment of the invention with more of the components represented.

Wire guides 3 and 4 are accommodated in a processing head or wire-guide head 5 in the form of a rotating hollow cylinder. It is the rotation of wire-guide head 5 that rotates the guides.

Wire-guide head 5 is surrounded by an annular flange 6 with cogs 7 around its edge. Cogs 7 are engaged by a transmission 8. Transmission 8 is driven by a motor 9. Motor 9 is controlled and regulated by a decoder 10. The motor can be a stepper or, if appropriate circuitry is provided, a direct-current motor. Decoder 10 is connected to the apparatus' unillustrated computerized controls, which allows complete automation of the rotations.

A similar, unillustrated, lower processing or wire-guide head can be accommodated downstream. The lower wire guide in one particularly simple embodiment of the invention is a ring with sliding contacts that simultaneously functions as a source of electric current. In summary, the apparatus in accordance with the invention is amazingly uncomplicated and inexpensive in relation to its results. At the bottom of FIG. 4 is a top view specifically illustrating the simplicity of wire-guide head 5. The wire can either be threaded through wire guides 3 and 4 by hand or by shifting them radially inside wire-guide head 5 until they coincide vertically (an approach not illustrated in FIG. 4).

The position of the rotating wire guides in U–V plane, in the X–Y plane, or in both or in a plane parallel thereto, which is also the position of the axis or axes of rotation, can be varied with an arm 11 fastened to wire-guide head 5.

Also fastened to wire-guide head 5 is a wire threader 12 that advances wire 1 through the unillustrated downstream workpiece. Wire threader 12 which is more or less cylindrical in this embodiment, has a tube 13 that commences just below lower wire guide 3. Tube 13 extends through a chamber 15 that can be pressurized. At the bottom of chamber 15 is an outlet 14 that surrounds the bottom of tube 13. The cylindrical surface of wire threader 12 is not completely continuous but includes a slot 16 that extends radially from the inner surface of tube 13 to the outer surface of the threader. A plug 17 fits tight in slot 16. When plug 17 is in slot 16, both chamber 15 and tube 13 are completely sealed off around the circumference. A wire inside tube 13 can accordingly not slip out of it radially. Chamber 15 can be pressurized with fluid, with the dielectric employed for the electro-erosive cutting for instance. The pressure will force the fluid out of chamber 15 and propel it down out of outlet 14. If the wire is now advanced down, it will be entrained by the emerging jet and inserted into a starting bore in the workpiece for example.

Once the wire has been threaded, plug 17 will be radially extracted as far as necessary from slot 16. Wire 1 can now be swung out along slot 16 by shifting the guides above and below the workpiece in order to cut along a conical angle. Since wire threader 12 is coupled to wire-guide head 5, it will automatically rotate along with it. The wire will accordingly be correctly oriented along slot 16 for cutting at conical angles and for changing the direction of the cut in any way. The wire in the position represented by the thin line, rotated 180°, is to be understood as resulting from a similar rotation of the threader, a situation that is for simplicity's sake not represented in FIG. 4.

Figure 5:
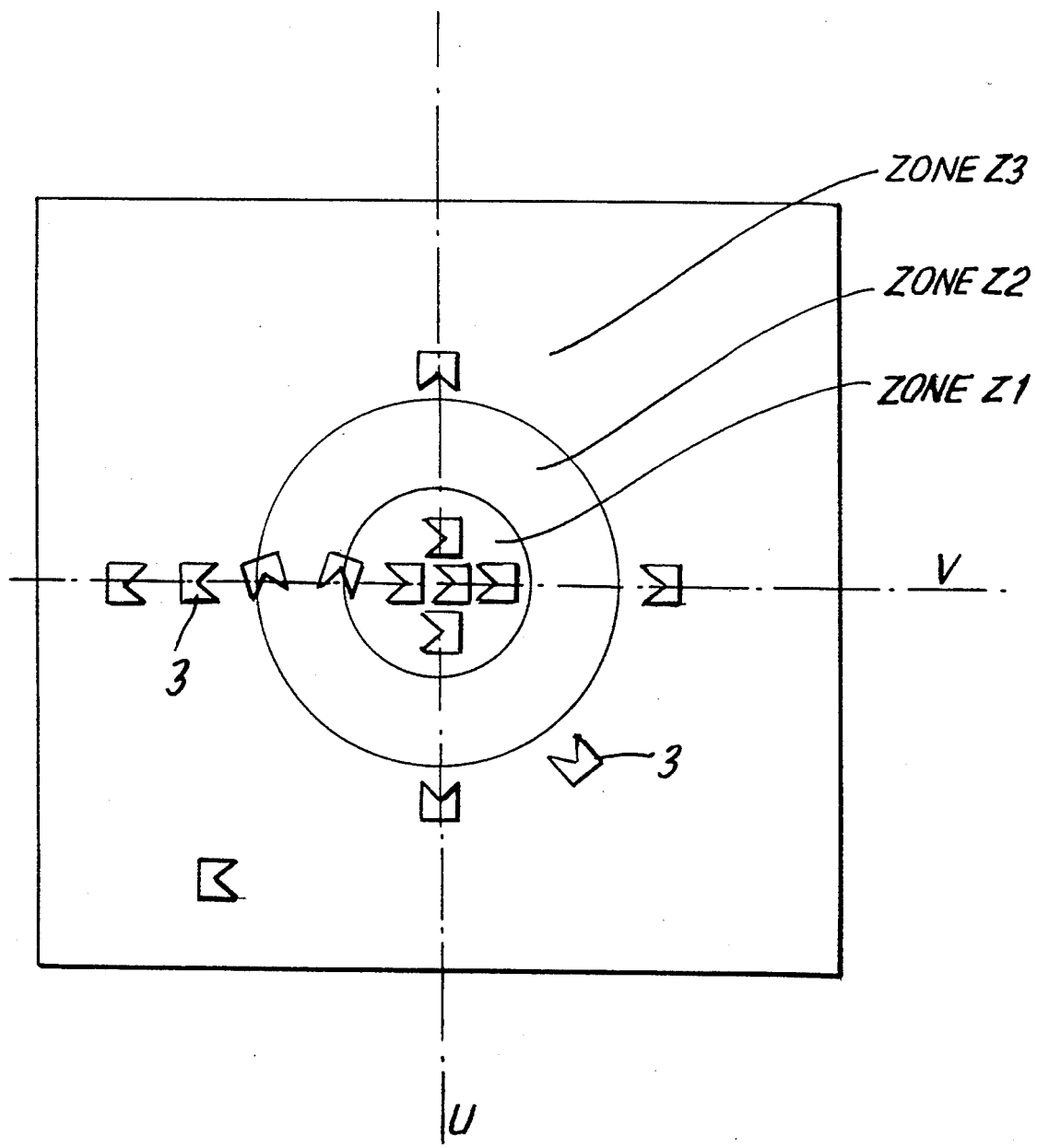
FIG. 5 illustrates how material is cut in accordance with the invention.

The novel cutting tactics represented in FIG. 5 can be carried out with the embodiments illustrated FIGS. 2, 3, and 4. In Zone 1, immediately surrounding the axis of rotation, there is no need to rotate the wire guides at all while the cut is performed at slight conical angles, at not much of a slope, that is. An attempt is made in the transitional zone Z2 to rotate wire guide or guides 3 to an "ideal" maximal angle of 90°. Farther out, in zone Z3, wire guide 3 is rotated to an even more ideal angle, with its notch facing the axis of rotation. These tactics avoid too rapid rotations in the inner zones Z1 and Z2. The wire guide can of course also be rotated more or less out of an ideal position as illustrated at the bottom left of FIG. 5 if desired. The number of zones and their associated maximal deviations from the ideal can be increased as desired, depending on the cutting conditions.

Figure 6A:
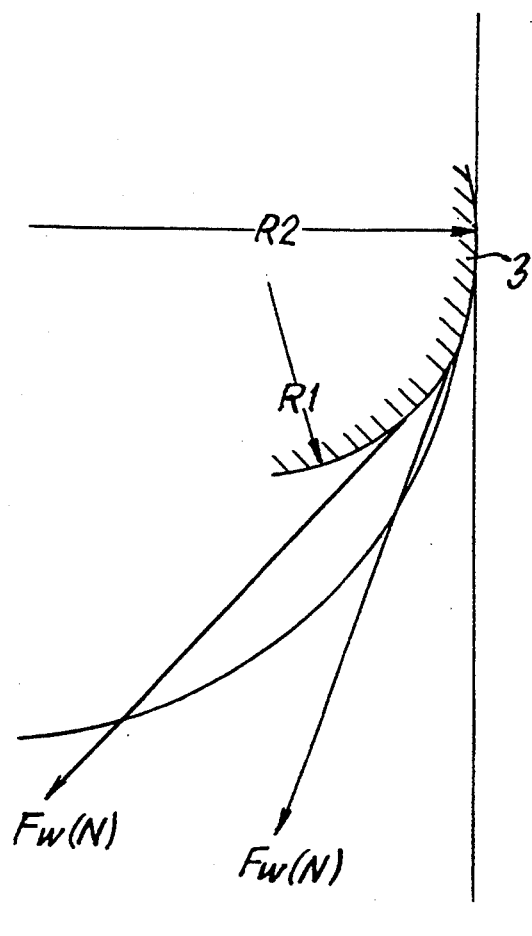
FIG. 6a is a schematic cross-section through a wire guide invention.
Figure 6B:
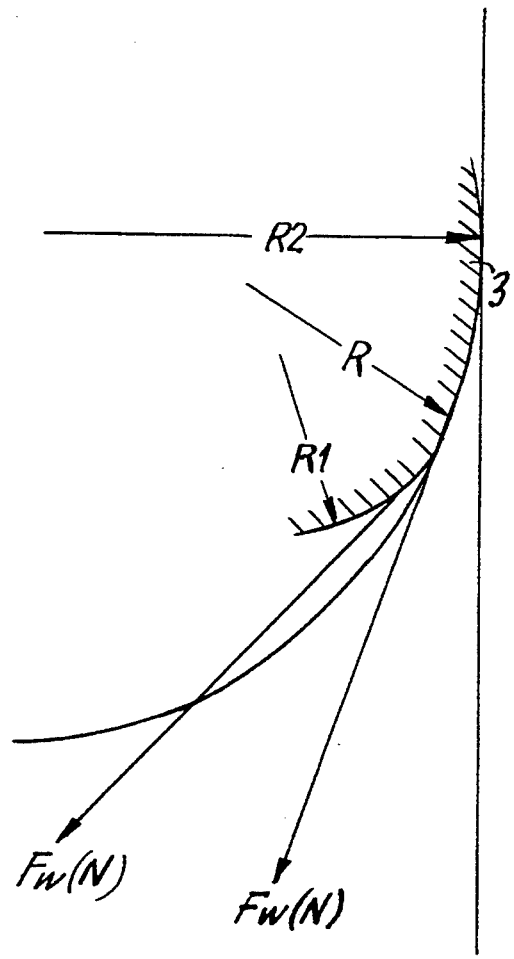
FIG. 6b is a schematic cross-section through another embodiment of a wire guide in accordance with the invention.

FIGS. 6a and 6b, finally, illustrate wire guides with particularly advantageous cross-sections (as obtained along the line A–A' in FIG. 1). It is beneficial in accordance with this concept for the curvature of the cross-section of a rotating open wire guide being employed for cutting at a conical angle to vary (and for the associated radius to vary accordingly) instead of remaining constant. The curve can be a parabola or, in a simpler approach, two or more superposed arcs of circles with different radiuses. A curvature that increases downward represents a particular discovery, specifically that cutting at obtuse conical angles can sometimes decrease the "height" of the workpiece to the extent that the tension on the wire represented by the vectors $F_w(N)$ in FIGS. 6a and 6b can be kept lower. The wire will in this event also be less distorted and can be exposed to greater curvatures. The increasing curvature can easily be adapted to the height of the workpiece and its related wire tension by apparatus of appropriate design. The resulting wire guide 3 will be small enough to avoid the plastic deformations that result from too short a radius of curvature accompanying acute conical angles and heavy loads. FIG. 6a illustrates an embodiment of a wire guide 3 with a cross-section where the wire rests against it in the form of two circles with radiuses R1 and R2. The curvature in the embodiment illustrated in 6b is constituted by arcs of three circles with radiuses R1 R and R2. The cross-sectional contour can be stored in the computerized numerical controls and employed by appropriate software to compute ideal parameters for cutting conical cuts.

Wire guides 3 with curvatures that increase continuously toward the workpiece can be installed in the apparatus where the wire will separate from them when cutting at obtuse conical angles and more powerful curves.

I claim:

1. An apparatus for electro-erosive cutting of conical cuts in a workpiece with an advancing wire cathode comprising two wire guides, one wire guide located above the workpiece in direction of the advancing wire and the other wire guide located below the workpiece in direction of the advancing wire, the guides being mounted such that they can be displaced relative to each other to perform a conical cut, at least one wire guide being formed as an open V-groove guide, surrounding the advancing wire, and being mounted rotationally about the wire axis, so that during conical cutting the opening of the V-groove is rotated in the direction of the advancing wire, thereby asserting optimal force on the wire, further comprising an auxiliary wire guide associated with at least one wire guide, the at least one wire guide and the auxiliary wire guide being displacable in vertical or horizontal direction relative to the wire axis.

2. The apparatus of claim 1, wherein the auxiliary wire guide is provided with a ring having a sliding contact which serves as a source of supplying the wire with electric current.

3. The apparatus of claim 2, further comprising at least one motor which is electrically connected to computerized numerical controls and which rotates at least one of the wire guides automatically.

4. The apparatus of claim 3, further comprising a wire-position sensor which communicates with the computerized controls.

5. The apparatus of claim 1, wherein the at least one wire guide having a curved cross-sectional contour which gradually increases in the direction towards the work piece.

6. The apparatus of claim 5, wherein the curved cross-sectional contour is in the form of a parabola.

7. An apparatus for electro-erosive cutting of conical cuts in a workpiece with an advancing wire cathode comprising two wire guides, one wire guide located above the workpiece in direction of the advancing wire and the other wire guide located below the workpiece in direction of the advancing wire, the guides being mounted such that they can be displaced relative to each other to perform a conical cut, at least one wire guide being formed as an open V-groove guide, surrounding the advancing wire, and being mounted rotationally about the wire axis, so that during conical cutting the opening of the V-groove is rotated in the direction of the advancing wire, thereby asserting optimal force on the wire, wherein the rotational mounting of the at least one wire guide is accomplished by a rotatable cylindrical processing head.

8. The apparatus of claim 7, further comprising at least one wire threader with an opening and plug, coupled to the at least one rotating wire guide.

9. The apparatus of claim 8, wherein the at least one wire threader is rigidly fastened to the processing head.

10. The apparatus of claim 8, wherein the at least one wire threader has a pressurized chamber that can be sealed off.

11. A method for electro-erosive cutting of conical cuts in a workpiece with an advancing wire cathode, comprising the steps of providing two wire guides, forming at least one wire guide as an open V-groove guide, guiding the advancing wire through the open V-groove guide, displacing the two wire guides to each other as to allow for conical cutting of the work piece, rotating the open V-grooved guide about the axis of the wire cathode such that the wire is surrounded optimally by the V-groove so that an optimal force is asserted on the wire, and determining rotation and position of at least one wire guide in relation to a point of origin of coordinates by way of an ideal value in U–V axes position determined from a pre-programmed conical angle.

12. The method of claim 11, comprising a further step of determining rotation and position of the wire guide or guides relative to the point of origin of the coordinates in analogy to ideal points in U–V axes from a prescribe conical angle.

13. The method of claim 11, comprising a further step of rotating the at least one wire guide in incremental correction steps about the wire thereby avoiding unnecessary rapid rotations.

14. The method of claim 11, comprising a further step of including into calculating rotation and positioning of at least one the wire guide individual manufacturing parameters contained in memory.

15. The method of claim 14, comprising a further step of correcting any positional errors electronically in accordance with the angle and shape of the guide.

* * * * *